United States Patent
Borsutzki et al.

[11] 3,719,094
[45] March 6, 1973

[54] VIBRATION GENERATOR

[76] Inventors: Eberhard Borsutzki, P.O. Box 466, Harburger Strasse 122, D 2130-Rotenburg (Wumme); Gerhard Liehmann, Quellenweg 12, D445 Laxten-Lingen, both of Germany

[22] Filed: Aug. 31, 1971

[21] Appl. No.: 176,754

Related U.S. Application Data

[63] Continuation of Ser. No. 858,082, Sept. 15, 1968, abandoned.

[30] Foreign Application Priority Data

Sept. 13, 1968 Germany...................P 17 58 966.7

[52] U.S. Cl.............................................74/87
[51] Int. Cl. ...........................................B06b 1/16
[58] Field of Search .........74/61, 87; 94/48; 209/367, 209/366.5

[56] References Cited
UNITED STATES PATENTS 2,309,172   1/1943   DeKanski............................74/61 X

*Primary Examiner*—Milton Kaufman
*Attorney*—Olson, Trexler, Walters and Bushnell

[57] ABSTRACT

A vibration generator, in particular for soil compacting machines or the like, comprises an unbalance mass which is rotatably eccentrically journalled on a crank mounted on a drive shaft and having a driving wheel in operative connection with a stationary mating wheel, concentric with the drive shaft and rotatable thereabout, characterized in that the driving wheel and mating wheel have the same dimensions so that, in operation, the driving wheel of the unbalance mass rolls on the stationary mating wheel and causes the distance between the center of gravity of the unbalance mass and the drive shaft to traverse a maximum and minimum off-set by 180° or 0° for each rotation.

9 Claims, 3 Drawing Figures

VIBRATION GENERATOR

This application is a continuation of application Ser. No. 858,082, filed Sept. 15, 1968 now abandoned.

The invention relates to a vibration generator, in particular for soil compacting machines or the like, having an unbalance mass eccentrically and rotatably journalled on a crank mounted on a drive shaft and having a drive wheel, in operative connection with a stationary mating wheel which is concentric with the drive shaft and is pivotable about the same.

The vibration generator is the essential member of soil compacting machines, so-called vibrators, to which the invention principally refers, but is also used in other apparatus, for example vibratory conveyors which work with mechanically generated unbalance vibrations while utilizing the centrifugal forces of eccentrically rotating unbalance masses.

If the unbalance mass merely rotates eccentrically around the drive shaft, as was originally the case, the centrifugal forces produced thereby will be of equal magnitude in each direction. For a soil compacting machine this means that the forces acting on the soil surface are as large as the lift-off forces orientated perpendicularly away from said soil surface and that in addition to the forces oriented perpendicularly to the soil surface there are forces orientated parallel to the soil surface which permit the soil compacting machine to vibrate horizontally without however providing a forward drive thereto. In order to eliminate such horizontal force components which are frequently undesirable, two unbalance masses have been provided to be operated in synchronism and in opposite directions of rotation so that their horizontal force components cancel each other but their vertical force components are made additive. This provides a linear vibration whose amplitudes however would be of equal magnitude in both directions (towards the soil surface and away from the soil surface).

The same result is also obtained with the vibration generator described hereinbefore in which the unbalance mass is disposed on a driving gear-wheel which rolls in a stationary internal gear-wheel (mating wheel) having twice the pitch circle diameter. Since the distance from the center of gravity of the unbalance mass, which rotates with the drive wheel around the pin of a cam which moves the drive wheel on a circular track, is equal to the pitch circle radius of the driving wheel, the center of gravity travels on a straight hypocycloidal path. Having only one unbalance mass a linear force vibration will also be obtained in this case, said vibration having two oppositely orientated amplitudes (maxima) of equal magnitude as in the previously described case.

On the other hand it is possible for the direction of linear force vibrations to be easily varied in the aforementioned vibration generator. The straight hypocycloid pivots to the same extent to which the stationary internal gearwheel (mating wheel) is pivoted. Such a change of direction of the vibration maximum is frequently desirable in order to vary the magnitude of the force component acting perpendicularly with respect to the soil surface in the case of a soil compacting machine (said force component being principally responsible for soil consolidation) or by an angular adjustment of the maximum total force relative to the soil surface to achieve a forward drive of the soil compactor in one or the other direction in addition to the soil compacting effect. The last mentioned feature is not possible in the previously described vibration generator because the horizontal components of the inclined linear vibration of equal magnitude cancel each other.

However, the fact, already mentioned, that the force maximum in one direction is opposed by an oppositely orientated maximum of identical magnitude is a disadvantage of the last described vibration generator.

The object of the invention is to provide a vibration generator in which the maximum force is generated in only one direction, the direction of said maximum force being however variable even during operation.

Based on the initially described vibration generator, this problem is solved according to the invention in that the driving wheel of the unbalance mass rolls on the mating wheel of identical size and causes the distance between the center of gravity of the unbalance mass and the drive shaft to traverse during each rotation a maximum and a minimum, off-set by 180° or 0° respectively.

Rolling of the driving wheel on an external gearwheel of the same pitch circle diameter instead of the known rolling in an internal gearwheel of twice the pitch circle diameter imparts a completely different characteristic to the magnitude of centrifugal forces produced during one rotation. The maximum force is not merely diametrally opposed by a minimum force or at least a substantially smaller force, it is also possible by varying the distance of the center of gravity of the unbalance mass from the axis of rotation of the driving wheel, that is to say from the crank pin, to produce very different characteristics of the centrifugal force over the circumference. If — as is usually preferred — the distance of the center of gravity of the unbalance mass from its axis of rotation is at least approximately equal to half the effective radius of the driving wheel, the center of gravity of the unbalance mass during one rotation will traverse on a continuous curve having a maximum and minimum off-set by 180°.

The center of gravity of the unbalance mass will describe a cardioid if its distance from the axis of rotation of the driving wheel is equal to its effective radius. The instability point of said cardioid represents the minimum of the distance of the center of gravity from the drive shaft which in turn is off-set by 180° relative to the maximum distance. If the distance of the center of gravity of the unbalance mass from the axis of rotation of the driving wheel becomes greater than twice the effective radius of the driving wheel, that is to say if it becomes greater than the distance of the driving wheel crank pin from the drive shaft, the distance vector of the center of gravity of the unbalance mass will be orientated in the same direction and have a maximum and minimum distance expectively between the center of gravity of the unbalance mass and the axis of the drive shaft.

An exemplified embodiment of the invention is illustrated in the drawings of which FIG. 1 is a longitudinal section through a vibration generator;

Figure 1:
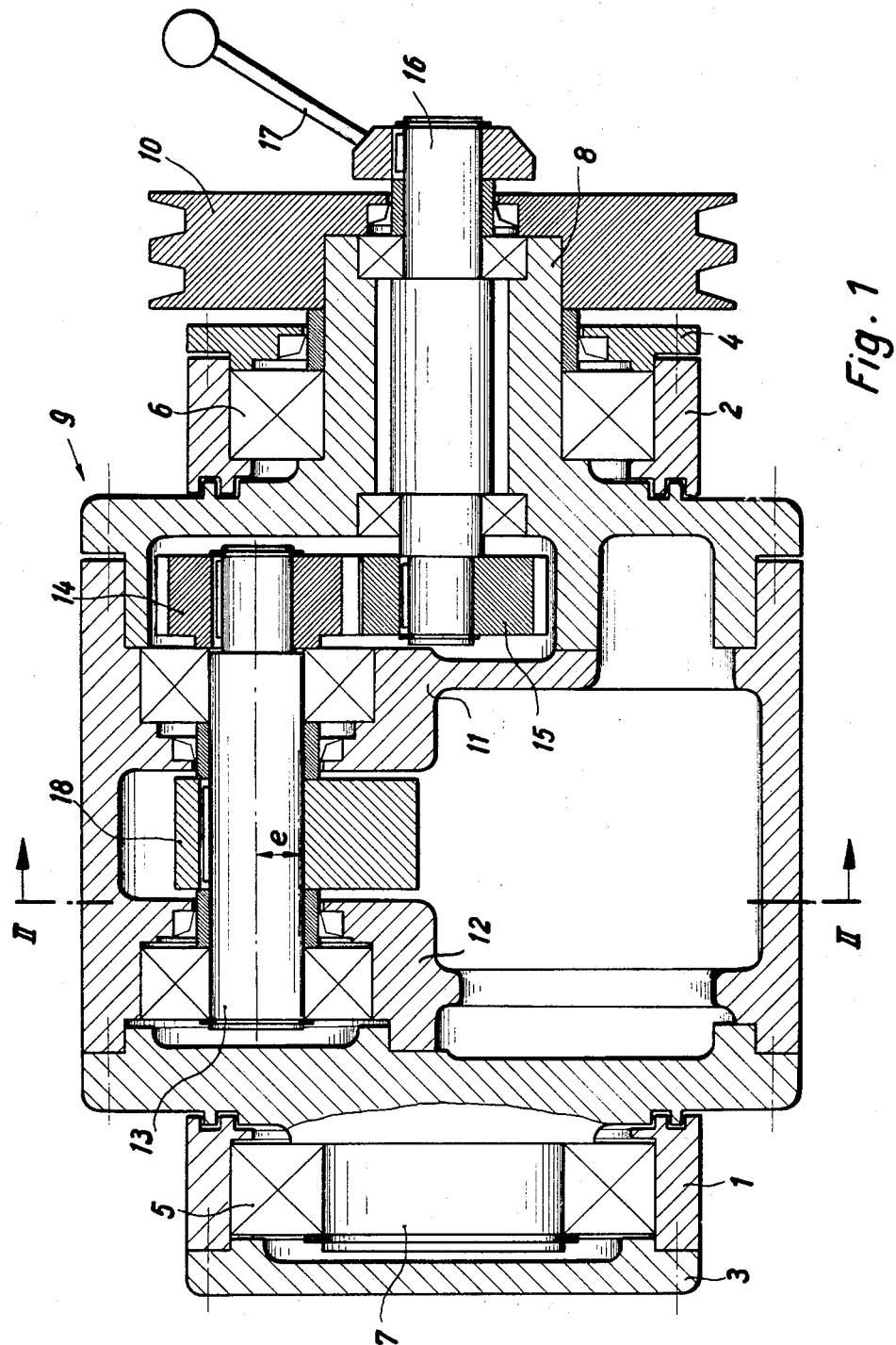

Bearings 5, 6, accommodating the shaft journals 7, 8 of a housing referenced in its entirety by the numeral 9 are disposed in bearing supports 1, 2 which are closed by flange covers 3, 4 and are mounted, for example, in a soil compacting machine. The shaft journals 7, 8 represent the driving shaft of the vibration generator which is driven in turn by an electric motor or internal combustion engine not shown, by means of V-belts, which run on the belt pulley 10 mounted on the shaft stub 8.

The housing 9, driven by the shaft members 7,8, and being partially integral therewith accommodates the crank with the crank webs 11, 12 as well as the crank pin 13 which is rotatably journalled therein. The end of the crank pin 13 is extended in the direction of the shaft stub 8 via the crank web 11 and supports the driving wheel 14 for the crank pin and the unbalance mass 18 mounted between the journals on the crank pin 13 by means of a shaft key, said unbalance mass having the shape of a circular disc as shown for the illustrated example in FIG. 2. The center of gravity of said unbalance mass is eccentrically off-set by the dimension $e$ relative to the axis of the crank pin 13.

The driving wheel 14 meshes with a mating wheel 15 of the same pitch circle diameter which is stationarily mounted on a shaft 16 extending through the hollow shaft stub 8 and being journalled therein. The shaft 16 with the mating wheel 15 is therefore stationary if the housing 9 is driven via the shaft stub 8; where appropriate, the stationary position may be secured by a friction brake or ratchet means.

However, the shaft 16 is rotatable independently of the rotation of the shaft stub 8 and the housing 9, a hand lever 17, mounted on the shaft 16, serving for the adjustment of its angular position.

Figure 2:
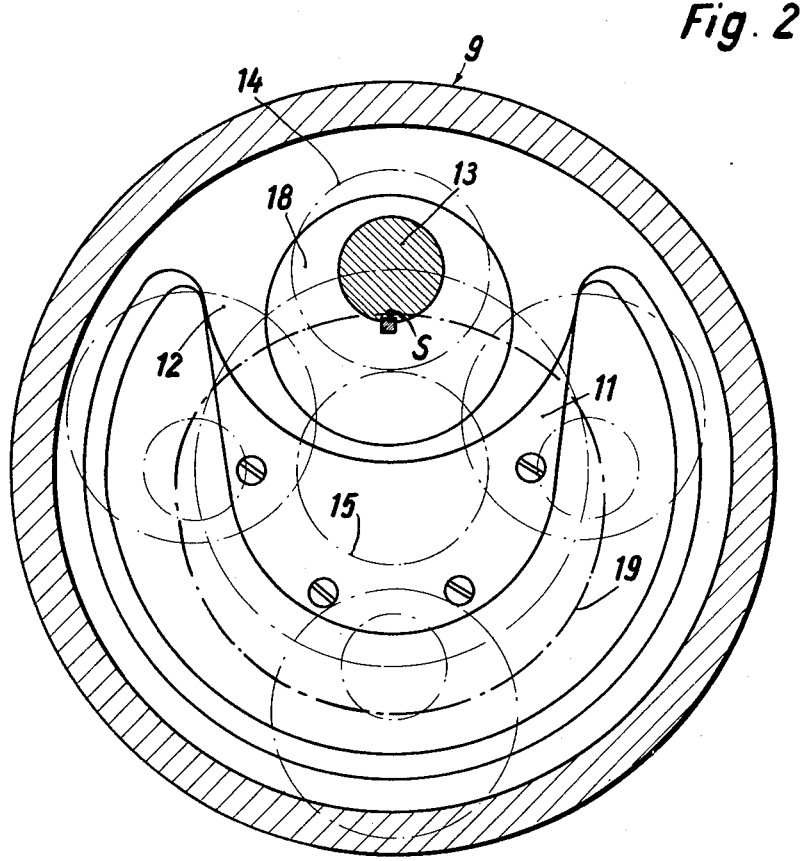
FIG. 2 is a cross section along the line II—II of FIG. 1.

It is evident that the crank pin 13 may also be considered as the planet shaft of a planetary gear, the driving wheel 14 rotating as a planetary gear around the sun wheel 15. In fact, several planetary shafts or crank pins 13 with planetary wheels or driving wheels 14 may be disposed within the housing, all rolling on the same stationary sun wheel or mating wheel 15. It is clear that in such a case the eccentricities $e$ of all unbalance masses 18 must be orientated in the same direction at any given moment of time during one rotation. FIG. 2 indicates by broken lines the position taken up by the unbalance mass 18 (and its crank pin 13) if the housing 9 is rotated from the position shown in solid lines through 90°, 180° and 270°. The dash-dot line 19 indicates the path of the center of gravity S of the mass 18 in the course of one rotation. Since the amount of eccentricity $e$ is equal to half the pitch circle radius of the driving wheel 14, this path will follow a continuous curve.

Figure 3:
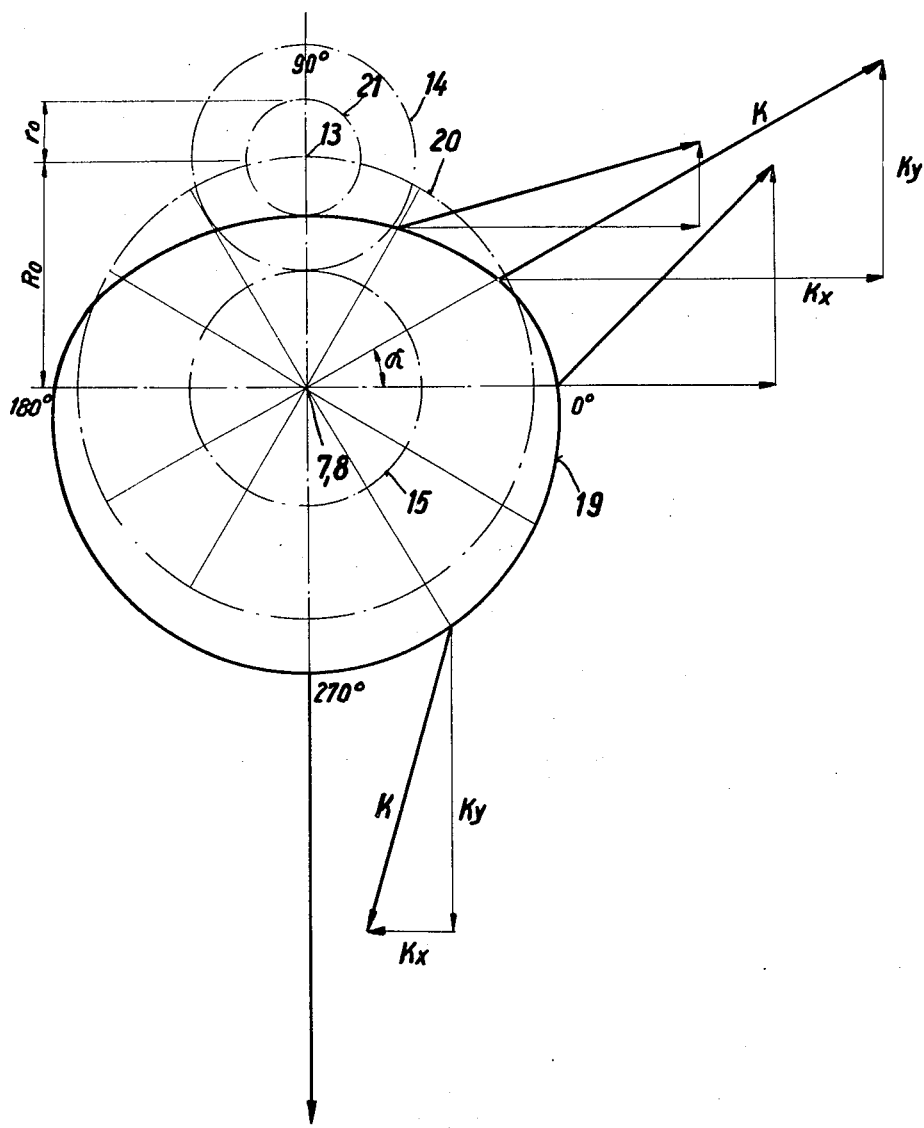
FIG. 3 is a sketch of the kinematic and dynamic method of operation.

The path of the center of gravity S of the unbalance mass 18 is also shown in FIG. 3. This also indicates the circular track 20 of the crank pin 13 which supports the unbalance mass 18 and the circular track 21 described twice by the center of gravity S around the crank pin 13 during each rotation of said crank pin 13 around the drive shaft 7, 8.

In FIG. 3 the radius of the circular path 20, equal to one and a half times the pitch circle radius of the driving wheel 14 as well as of the equally large mating wheel 15 is referenced with $R_o$ and the radius of the circular path 21, corresponding to the amount of eccentricity $e$, is referenced with $r_o$. For the reasons mentioned above, $r_o$ is equal to ⅓ $R_o$.

FIG. 3 also illustrates the forces produced during a half rotation of the unbalance mass 18, namely the total forces K as well as their horizontal components Kx and their vertical components Ky at a distance of 30° respectively.

If the mating wheel is moved from the stationary position illustrated in FIGS. 1 and 2, which also applies to FIG. 3, into another stationary position by rotation of the hand lever 17, the maximum of the resultant force K as well as its vertical components Ky, being vertically downwardly orientated, will rotate by a corresponding angular amount and the vertical component Ky will become correspondingly smaller as the center of gravity S of the mass traverses through the 270° vector in FIG. 3. The minimum horizontal component Kx will be rotated by the same amount in the other direction so that a simultaneous unbalance of the forces in the horizontal and vertical planes and therefore a forward motion of the vibration generator or of the soil compactor driven thereby is produced in that direction in which the maximum of the distance of the center of gravity from the drive shaft was rotated. It is evident that rotation of the shaft 16 and therefore of the mating wheel 15 may be performed at any time during operation of the vibration generator.

It is fundamentally possible and is within the scope of the inventive concept to mount the unbalance mass 18 not on the crank pin 13 but on a further planetary shaft which describes a circular path around the crank pin 13.

We claim:

1. A vibration generator having a drive shaft, a stationary mating wheel on a fixed shaft and coaxial with the drive shaft, a crank rotatable with said drive shaft and having a crank pin rotatable thereon, said crank pin having a driving wheel in driving connection with said mating wheel, an unbalance mass eccentrically fixed to said crank pin, characterized in that the driving wheel and mating wheel have a one-to-one driving ratio so that, in operation, the driving wheel rolls on the stationary mating wheel and causes the center of gravity of the unbalance mass to move in an orbit about the central axis of the mating wheel such that maximum and minimum radial distances of the center of gravity of the unbalance mass from the central axis of the mating wheel will be produced, said maximum and minimum radial distances being offset by 180° from each other for each orbit.

2. A vibration generator according to claim 1 characterized in that the driving wheel and the mating wheel are gearwheels which roll upon each other.

3. A vibration generator according to claim 1, characterized in that the distance of the center of gravity of the unbalance mass from its axis of rotation is at least approximately equal to half the effective radius of the driving wheel.

4. A vibration generator according to claim 2, characterized in that the distance of the center of gravity of the unbalance mass from its axis of rotation is at least approximately equal to half the effective radius of the driving wheel.

5. A vibration generator according to claim 1, characterized in that said fixed shaft is concentric within the drive shaft and is rotatably adjustable relative to the drive shaft.

6. A vibration generator according to claim 1, characterized in that the drive shaft includes housing means accommodating the crank and crank pin.

7. A vibration generator according to claim 6, characterized in that crank webs are associated with the crank pin.

8. A vibration generator according to claim 1, characterized in that the drive shaft includes end shaft journals with included housing means therebetween accommodating the crank pin, mass and driving and mating wheels.

9. A vibration generator according to claim 8, characterized in that said fixed shaft is within one end journal and is relatively adjustable relative thereto.

* * * * *